United States Patent Office 3,376,236
Patented Apr. 2, 1968

3,376,236
VINYL ALKANOATE-ALKYL MALEAMATE COPOLYMERS AS SURFACTANTS FOR POLYURETHANES
William E. Erner, Hamden, Conn., assignor to The Upjohn Company, Kalamazoo, Mich., a corporation of Delaware
No Drawing. Filed Dec. 30, 1964, Ser. No. 422,422
5 Claims. (Cl. 260—2.5)

ABSTRACT OF THE DISCLOSURE

Polyurethane foams are prepared using as surfactant a binary copolymer of a vinyl alkanoate (vinyl acetate typical) and an alkyl maleamate (butyl N,N-dimethylmaleamate typical) or a ternary copolymer of the above two components plus a dialkylmaleate.

---

This invention relates to an improved process for the preparation of polyurethane foams and is more particularly concerned with a novel surface-active agent for use in the reaction of a polyisocyanate and a polyol to form a polyurethane foam.

The formation of polyurethane foams by reaction of a polyisocyanate and a polyol in the presence of a catalyst and a blowing agent is well-known in the art; see, for example, Saunders et al., Polyurethanes, Chemistry and Technology, Part I, Interscience Publishers, New York, 1962, pp. 219 et seq. Two methods of forming such foams are commonly employed. In the "one-shot" technique the polyisocyanate, polyol, catalyst, and foaming agent are mixed simultaneously and allowed to foam. In the prepolymer technique the polyisocyanate is reacted with less than an equivalent amount of polyol to form an isocyanate-terminated prepolymer which is subsequently reacted with further polyol and/or water, a blowing agent and a catalyst to produce the desired foam.

Whichever technique is employed is has been found previously to be advantageous to employ a surface-active agent in the foam mix in order to stabilize a foam during the rise and to produce fine and more uniformly sized cells. The surface-active agents used hitherto for this purpose have generally been of the organo-silicone class although certain nonionic non-silicon containing surfactants such as the polyoxypropylene-polyoxyethylene glycols and the like have been used successfully in various foam systems. The various silicon and non-silicon containing surfactants hitherto employed as surfactants in the preparation of polyurethane foams suffer the disadvantage that their activity and usefulness in the foaming reaction are frequently reduced if they are maintained in admixture with the other foam ingredients for any length of time prior to foaming. This problem is accentuated where organophosphorus flame retardants and/or highly halogenated organic flame retardants are present as components of the foam mix.

I have now found that a novel class of non-silicon containing surfactants can be employed in the formation of polyurethane foams and is free from the above noted disadvantages of the prior art surfactants. The novel surfactants employed in the preparation of polyurethane foams according to this invention are copolymers selected from the class consisting of:

(a) Binary copolymers of a vinyl ester of an alkanoic acid containing from 1 to 18 carbon atoms, inclusive, and a maleamate ester having the formula:

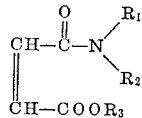

wherein $R_1$ and $R_2$ taken individually are selected from the class consisting of hydrogen and lower-alkyl and $R_1$ and $R_2$ taken together with the attached N atom represents a 5 to 7 ring atom heterocyclic radical, and $R_3$ represents alkyl from 2 to 8 carbon atoms, inclusive, provided that $R_1$ and $R_2$ do not each represent hydrogen simultaneously and that the total number of carbon atoms in $R_1$ and $R_2$ is within the range of 2 to 8; and (b) Ternary copolymers of a vinyl ester of an alkanoic acid containing from 1 to 18 carbon atoms, inclusive, a maleamate ester having the Formula I wherein $R_1$, $R_2$ and $R_3$ have the significance defined above, and a di-(lower-alkyl)maleate.

The term "lower-alkyl" means alkyl containing from 1 to 8 carbon atoms, inclusive, such as methyl, ethyl, propyl, butyl, pentyl, hexyl, heptyl, octyl, and isomeric forms thereof. The term "5 to 7 ring atom heterocyclic radical" means pyrrolidino, lower-alkylpyrrolidino such as 2 - methylpyrrolidino, 2,2 - dimethylpyrrolidino, 3-methylpyrrolidino and the like, piperidino, lower-alkylpiperidino such as 2-methylpiperidino, 3-methylpiperidino, 4-methylpiperidino and the like, morpholino, lower-alkylmorpholino such as 2-methylmorpholino, 3-ethylmorpholino, and the like, piperazino, lower-alkylpiperazino such as 2-methylpiperazino, 3-ethylpiperazino, and the like, homomorpholino, homopiperazino, hexamethyleneimino, and the like. The term "alkanoic acid containing from 1 to 18 carbon atoms, inclusive" means a saturated aliphatic hydrocarbon carboxylic acid containing the stated number of carbon atoms such as formic, acetic, propionic, isobutyric, octanoic, dodecanoic, tetradecanoic, octadecanoic acid and the like.

It is an object of the invention to provide a novel class of copolymers. It is a further object of the invention to provide an improved process for the preparation of polyurethane foams by use of a novel class of copolymers as surfactants in the foam mix.

The invention comprises a process for the preparation of a polyurethane foam by reaction of a polyisocyanate and a polyol in the presence of a catalyst, foaming agent and the like additives, characterized in that there is present as surface-active agent in the foam mix a copolymer of the class defined above.

The copolymers defined above which are employed in the process of the invention are prepared by interpolymerization of the monomers using a polymerization initiator under conditions well-known in the art. Illustratively, the polymerization can be conducted conveniently by mixing the monomers in the appropriate proportions under an inert atmosphere such as that provided by nitrogen, argon, krypton and like inert gases, adding a polymerization initiator and heating the resulting mixture at the desired polymerization temperature until polymerization is complete. The polymerization initiators, also referred to as free radical sources, which are employed are those conventionally used in the art such as dimethyl peroxide, 2,2'-azobis(isobutyronitrile), benzoyl peroxide, tert.-butyl hydroperoxide, ascaridole, and the like. The initiator can be added in a single batch at the beginning of the polymerization but is preferably added portionwise at intervals during the course of polymerization.

The temperature at which the polymerization is conducted is advantageously within the range of about 40° C. to about 135° C. depending upon the particular initiator employed. As is well-known in the art the temperature at which any particular polymerization is carried out optimally is determined primarily by the half-life of the initiator. For example, the temperature at which polymerization is carried out is preferably in the range of about 60° C. to about 100° C. when benzoyl peroxide or 2,2'-azobis (isobutyronitrile) is employed as initiator whereas higher temperatures of the order of about 135° C. are preferable using initiators such as tert.-butyl hydroperoxide.

The proportions of the various monomers employed in making the copolymers are so adjusted that the resulting copolymers are viscous liquids or low-melting solids. Advantageously, when making the binary copolymers of type (a) above, the vinyl alkanoate and the maleamate of Formula I are employed in molar proportions within the range of about 4:3 to about 3:1, preferably in the molar proportions of about 2:1. When making the ternary copolymers of type (b) above, the vinyl alkanoate, alkyl maleamate, and dialkyl maleate are advantageously employed in the molar ratio of about 1:4:2 to about 4:2:1; preferably, the molar ratio of the monomers, in the above order, is 2:4:1.

The alkyl maleamates of Formula I, which are employed as monomers in the formation of the copolymers of the invention, can be prepared by methods conventional in the art. For example, the appropriate amine

wherein $R_1$ and $R_2$ have the significance above defined, is condensed with maleic anhydride to form the correspondingly substituted maleamic acid which is then esterified with the appropriate alcohol $R_3OH$ where in $R_3$ has the significance hereinbefore defined. The reaction of the maleic anhydride and amine is advantageously carried out at about room (25° C.) temperature and in the presence of an inert solvent such as ether, tetrahydrofuran, methanol, ethanol, isopropanol, benzene, toluene, and the like. The reaction conditions employed are advantageously those described by Meheta, J. Org. Chem., 25, 1013, 1960. The esterification of the resulting maleamic acid is carried out by reacting the acid and the appropriate alcohol in the presence of an esterification catalyst such as sulfuric acid, hydrochloric acid, boron trifluoride etherate and the like. The conditions employed are those conventionally employed in the art.

In a particularly convenient method of preparing the maleamates (I) the condensation of the maleic anhydride and the appropriate amine is carried out in the presence of the alcohol which is to be used to esterify the resulting maleamic acid. When the formation of the maleamic acid is complete the esterification is accomplished by adding the appropriate esterification catalyst to the reaction mixture.

In an alternative method of preparation of the maleamates of Formula I the appropriate dialkylmaleate

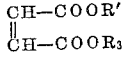

wherein R′ represents lower-alkyl and $R_3$ is as hereinbefore defined, is reacted with the appropriate amine

wherein $R_1$ and $R_2$ have the significance hereinbefore defined. The reaction is generally exothermic and can be controlled by employing at inert diluent such as those enumerated above, or by adding the amine portionwise to the maleate or by a combination of these methods. The reaction temperature is not critical however and any temperature short of the decomposition point of the product or reactants can be employed. Preferably the reaction is allowed to take place at a temperature of the order of about 100° C. to about 150° C. and is maintained at this level until reaction is complete.

The maleamates (I) prepared by any of the various methods described above can be purified by conventional procedures such as by chromatography, distillation in the case of liquids, or recrystallization in the case of solids. Such purification is normally essential to success in the subsequent copolymerization of the maleamate with the other monomers of the copolymers (a) and (b) above.

Representative of the maleamates of Formula I are the ethyl, propyl, isopropyl, sec-butyl, hexyl, heptyl and octyl esters of

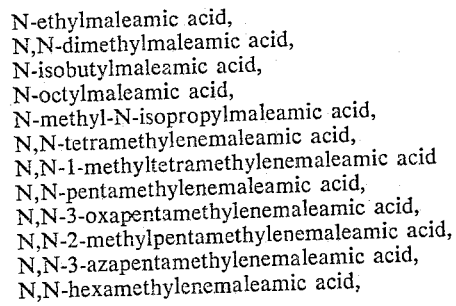

N-ethylmaleamic acid,
N,N-dimethylmaleamic acid,
N-isobutylmaleamic acid,
N-octylmaleamic acid,
N-methyl-N-isopropylmaleamic acid,
N,N-tetramethylenemaleamic acid,
N,N-1-methyltetramethylenemaleamic acid
N,N-pentamethylenemaleamic acid,
N,N-3-oxapentamethylenemaleamic acid,
N,N-2-methylpentamethylenemaleamic acid,
N,N-3-azapentamethylenemaleamic acid,
N,N-hexamethylenemaleamic acid, and the like.

The vinyl alkanoates which are employed as monomers of the binary copolymers of type (a) and the ternary copolymers of type (b) above are well-known in the art. Representative vinyl alkanoates are vinyl formate, vinyl acetate, vinyl propionate, vinyl isobutyrate, vinyl octoate, vinyl stearate, vinyl octadecanoate, and the like.

The dialkyl maleates which are employed as monomers in the preparation of the ternary copolymers of type (b) above are also well-known in the art. Representative of such compounds are dimethyl maleate, diethyl maleate, ethyl methyl maleate, diisobutyl maleate, dipentyl maleate, di(2-ethylhexyl)maleate, and the like.

The copolymers of types (a) and (b) can be employed as surfactants in the preparation of polyurethane foams of the flexible, semi-rigid and rigid types. The copolymers can be employed in either the one-shot or prepolymer methods of preparing foams and for these various purposes are generally present in the foam mix in a concentration of from about 0.2 to about 10 parts per hundred parts of polyol, preferably within the range of about 1 to about 3 parts per hundred parts of polyol; the exact proportion required for optimum results is a function, in part, of the particular copolymer and, in part, of the particular polyols which are used in conjunction and the above ranges represent approximate limits for the guidance of those skilled in the art. These ranges are not to be regarded as absolute limits since satisfactory results can be obtained in some cases using concentrations and proportions which fall outside the above limits.

In preparing polyurethane foams according to my invention any of the conventional methods for the preparation of rigid, semi-rigid, and flexible foams from polyisocyanates and polyols can be employed, the novel feature being the use of a copolymer of types (a) and (b) as the surfactant.

Any of the prior art polyisocyanates conventionally used in the preparation of rigid polyurethane foams can be employed in the process of the present invention. Illustrative of such isocyanates are 2,4-tolylene diisocyanate, 2,6-tolylene diisocyanate, 4,4′-diphenylmethane diisocyanate, dianisidine diisocyanate, tolidine diisocyanate, hexamethylene diisocyanate, m-xylylene diisocyanate, 1,5-naphthalene diisocyanate, the other di- and higher polyisocyanates such as those listed in the tables of Siefken, Ann. 562, 122–135 (1949). Mixtures of two or more of the above isocyanates can be used if desired. Preferred polyisocyanates are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. 2,683,730, 2,950,263, and 3,012,008; Canada Patent No. 665,495; and German Patent 1,131,877. A particularly preferred polyisocyanate of this type is the polymethylene polyphenyl polyisocyanate available commercially under the trademark PAPI.

Similarly any of the prior art polyols conventionally employed in the preparation of foams can be employed in the process of the invention. As mentioned previously the process for controlling the rate of rise in polyurethane foams according to this invention can be applied to a wide variety of foams including semi-rigid and rigid foams. For the reasons enumerated above it finds particular application in the preparation of rigid foams and it is to this particular use that the major proportion of the exemplification in this specification is directed. However, it will be understood that the present invention is not limited to this particular use and can be applied generally. The polyols conventionally employed in the preparation of polyurethane foams have a hydroxyl number within the range of approximately 180 to approximately 800. The polyols normally used for the preparation of rigid foams are those having a hydroxyl number in the range of approximately 300 to approximately 800.

Illustrative polyols which can be used in the process of the invention are polyethers such as polyoxyalkylene glycols e.g. the polyoxyethylene glycols prepared by the addition of ethylene oxide to water, ethylene glycols, or diethylene glycol; polyoxypropylene glycols prepared by the addition of 1,2-propylene oxide to water, propylene glycol or dipropylene glycol; mixed oxyethylen-oxypropylene polyglycols prepared in a similar manner utilizing a mixture of ethylene oxide and propylene oxide or a sequential addition of ethylene oxide and 1,2-propylene oxide; polyether glycols prepared by reacting ethylene oxide, propylene oxide or mixtures thereof with mono- and polynuclear dihydroxy benzenes, e.g., catechol resorcinol, hydroquinone, orcinol, 2,2-bis(p-hydroxyphenyl) propane, bis(p-hydroxyphenyl)methane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g., methyl, ethyl, propyl, butyl, and 2-ethylhexyl, arabinoside, xyloside, fructoside, glucoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5 - tris(hydroxymethyl)-5-methyl-4-hydroxytetrahydropyran and 3,3,5,5-tetrakis(hydroxymethyl)-4-hydroxytetrahydropyran; or polyols containing an aromatic nucleus such as 2,2-bis(hydroxyphenyl)ethanol, pyrogallol, phloroglucinol, tris(hydroxyphenyl)alkanes, e.g., 1,1,3-tris(hydroxyphenyl)ethanes, and 1,1,3-tris(hydroxyphenyl)propanes, etc., tetrakis(hydroxyphenyl)alkanes, e.g., 1,1,3,3 - tetrakis(hydroxy-3-methylphenyl)propanes, 1,1,4,4-tetrakis(hydroxyphenyl)butanes, and the like.

A particularly useful polyol for employment in the process of the invention is a polyol mixture comprising a polyol adduct produced by mixing under hydroxyalkylation conditions from 2 to 20 molecular equivalents of ethylene oxide, propylene oxide, 1,2-butylene oxide, or mixtures thereof, and one amine equivalent of a polyamine mixture, 100 parts of said polyamine mixture containing from 35 to 90 parts of methylene dianilines, the remaining parts being triamines and polyamines of higher molecular weight, said methylenedianilines, triamines, and polyamines of higher molecular weight having been formed by acid condensation of aniline and formaldehyde.

Illustrative of the polyester polyols which can be employed in the process of the invention are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol, 1,2-propylene glycol, 1,4-butanediol, and cyclohexanediol may also be used. In order that the polyurethane foam be sufficiently rigid, it is recommended that no more than about 20% of the hydroxyl groups of the polyester used be supplied by a diol. The above polyesters are typical of those which can be employed in the one-shot, but preferably in the prepolymer, methods of foaming using the process of the invention.

In making rigid foams in accordance with the process of the invention it is advantageous to add a hydroxyl terminated cross-linking polyol to the reaction mixture to form the best network for foam formation. Advantageously the crosslinking polyol should have at least 3 hydroxy groups in the molecule and can be added to the foam reaction mix at any point at which the other polyols are added. Examples of such crosslinking polyols are trimethylolpropane, glycerol, 1,2,6-hexanetriol, pentaerythritol, hydroxyalkylated aliphatic diamines such as N,N,N',N' - tetrakis(2 - hydroxypropyl)ethylenediamine, N,N,N',N' - tetrakis(2 - hydroxyethyl)ethylenediamine, and the like, and alkylene oxide reaction products of sugars such as sucrose, and the like.

The proportions of isocyanate to polyol employed in the foam mixtures according to the process of the invention are within the normal limits employed in the production of polyurethane foams. Thus the ratio of isocyanate to active hydrogen groups is within the range of from 1.50:1 to 0.65:1 and preferably within the range of 1.10:1 to 1:1, whether the isocyanate and polyol are employed separately in the one-shot process or whether the two components have been reacted to form a prepolymer. The lower ranges of isocyanate to hydroxyl group ratio are used where the polyol is highly functional.

The final foam density of the products produced by the process of the invention can be controlled in accordance with methods well known in the art. For example, this control can be accomplished by regulating the amount of water present in the foam mixture or by using a combination of water and a conventional blowing agent having a boiling point below about 110° C. and preferably below about 50° C. such as a volatile aliphatic hydrocarbon or a volatile highly halogenated hydrocarbon, for example, trichloromonofluoromethane, dichlorodifluoromethane, chlorotrifluoromethane, 1,1-dichloro-1-fluoroethane, 1-chloro-1, 1-difluoro-2,2-dichloroethane and 1,1,1-trifluoro-2-chloro-2-fluorobutane or mixtures thereof.

Any of the catalysts conventionally employed in the art to catalyse the reaction of an isocyanate with a reactive hydrogen containing compound can be employed in the process of the invention; see, for example, Saunders, ibid, vol. I, pp. 228–232; see also Britain et al. J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium as well as phosphines and tertiary organic amines. The preferred catalysts for use in the process and compositions of the invention are the tertiary organic amines of which the following are representative: triethylamine, triethylenediamine, N,N,N',N'-tetramethylethylenediamine, 1,1,3,3-tetramethylguanidine, N,N,N',N'-tetramethyl-1,3-butanediamine, N,N-dimethylethanolamine, N,N,-diethylethanolamine, and the like.

Optional additives such as flame retardants, fillers, pigments and the like commonly employed in the fabrication of polyurethane foams, can be employed in the process of the invention.

Illustrative of the flame retardants which can be used in the foams of the invention are the highly halogenated organophophorus compounds such as tris-(2,3-dibromopropyl)phosphate, supplied under the name "Firemaster" T23P, and the series of chloroethylated phosphorus derivatives available under the generic name of Phosgards.

A particularly advantageous method of increasing the fire retardant properties of the compounds produced by the process of the invention is to replace part of the polyol employed in the process of the invention by a phosphorus-containing polyol such as the products available commercially under the trade names of FR–P8, Vircol 82 and Vircol 638 and Fyrol 6.

The foams produced according to the process of the invention can be employed for purposes well-known in the art. For example the flexible foams can be employed for cushioning purposes in a variety of ways while the semi-rigid and rigid foams can be employed for thermal and sound insulation in conventional manner. The foams produced according to the process of the invention are characterized by small, uniform cells and by high stability. The rigid foams produced according to the invention are characterized by a very high proportion of uniformly-sized closed cells and by high structural stability under exposure to extremes of temperature and humidity.

The following examples describe the manner and process of making and using the invention and set forth the best mode contemplated by the inventor of carrying out the invention but are not to be construed as limiting.

EXAMPLE 1

(A) Preparation of butyl N,N-(3-oxapentamethylene) maleamate

A total of 80 g. (1 mole) of morpholine was added slowly with stirring to 256 g. (1 mole) of dibutyl maleate. The temperature during this addition was not allowed to rise above 130° C. When the addition was complete and the initial reaction had subsided the temperature of the reaction mixture was raised to 120 to 130° C. and maintained at this level for 4 hours. The resulting product was distilled under reduced pressure to give 228 g. of butyl N,N'-(3-oxapentamethylene)maleamate in the form of a liquid having a boiling point of 160° C. at a pressure of 8 mm. of mercury.

(B) Ternary copolymer of vinyl acetate, dibutyl maleate, and butyl N,N-(3-oxapentamethylene)maleamate A mixture of 485 g. (2 mole) of butyl N,N-(3-oxapentamethylene)maleamate, 345 g. (4 mole) of vinyl acetate, and 228 g. (1 mole) of dibutyl maleate was stirred under nitrogen and maintained at 85° to 90° C. (using the heat from a 250 w. I.R. lamp) while a total of 25 g. of 2,2'-azobis(isobutyronitrile) was added portionwise at 0.5 hr. intervals over a period of 10 hours. At the end of this time nitrogen was bubbled through the reaction mixture for a period of 2 hours to remove excess vinyl acetate. The residual ternary copolymer of vinyl acetate, dibutyl maleate, and butyl N,N-(3-oxapentamethylene) maleamate was a viscous liquid.

EXAMPLE 2

(A) Preparation of butyl N,N-dimethylmaleamate

A stream of dimethylamine was passed into 256 g. (1.12 mole) of dibutyl maleate until the weight of product reached 306 g. The temperature during this addition was controlled by cooling when necessary so that the temperature did not exceed 60° C. The resulting product was distilled under reduced pressure to obtain 199 g. of butyl N,N-dimethylmaleamate in the form of a liquid having a boiling point of 124° C. at a pressure of 1.0 mm. of mercury.

(B) Ternary copolymer of vinyl acetate, dibutyl maleate, and butyl N,N-dimethylmaleamate A mixture of 199 g. (1 mole) of butyl N,N-dimethylmaleamate, 172 g. (2 mole) of vinyl acetate, and 114 g. (0.5 mole) of dibutyl maleate was stirred under nitrogen and maintained at 85° C. to 90° C. while a total of 12.5 g. of 2,2'-azobis(isobutyronitrile) was added portionwise at 0.°5 hr. intervals over a period of 10 hours. At the end of this time, nitrogen was bubbled through the reaction mixture for a period of 2 hours to remove excess vinyl acetate. The residual ternary copolymer of vinyl acetate, dibutyl maleate, and butyl N,N-dimethylmaleamate was a viscous liquid.

EXAMPLE 3

Ternary copolymer of vinyl acetate, dibutyl maleate, and ethyl N-n-butylmaleamate Using the procedure described in Example 1, part B, but replacing butyl N,N - (3-oxapentamethylene)maleamate by ethyl N-n-butylmaleamate (Cotter et al., J. Org. Chem., 26, 1, 1961), there was obtained the ternary copolymer of vinyl acetate, dibutyl maleate, and ethyl N-n-butylmaleamate.

EXAMPLE 4

Ternary copolymer of vinyl acetate, dibutyl maleate, and butyl N-ethylmaleamate

Using the procedure described in Example 1, part B, but replacing butyl N,N-(3-oxapentamethylene)maleamate by butyl N-ethylmaleamate [prepared by esterifying N-ethylmaleamic acid (Meheta et al., supra) with butanol in the presence of conc. sulfuric acid], there was obtained the ternary copolymer of vinyl acetate, dibutyl maleate, and butyl N-ethylmaleamate.

Similarly, using the above procedure but replacing butyl N,N-(3-oxapentamethylene)maleamate by ethyl N-isopropylmaleamate, ethyl N-hexylmaleamate, propyl N-octylmaleamate, butyl N,N-diethylmaleamate, ethyl N,N-tetramethylenemaleamate and butyl N,N-pentamethylenemaleamate [all of which esters are prepared by esterifying the appropriate maleamic acids (Meheta et al., supra) with the appropriate alkanol in the presence of concentrated sulfuric acid] there are obtained the corresponding terpolymers of vinyl acetate, dibutyl maleate, and each of the above maleamates.

EXAMPLE 5

Binary copolymer of vinyl acetate and butyl N,N-dimethylmaleamate

A mixture of 727 g. (3 mole) of butyl N,N-dimethylmaleamate and 345 g. (4 mole) of vinyl acetate was stirred under nitrogen and maintained at 85° to 90° C. (using the heat from a 250 w. I.R. lamp) while a total of 25 g. of 2,2'-azobis(isobutyronitrile) was added portionwise at 0.5 hr. intervals over a period of 10 hours. At the end of this time, nitrogen was bubbled through the reaction mixture for a period of 2 hours to remove excess vinyl acetate. There was thus obtained a binary copolymer of vinyl acetate and butyl N,N-dimethylmaleamate.

Using the above procedure, but replacing vinyl acetate by vinyl formate, vinyl propionate, vinyl isobutyrate, vinyl octoate, vinyl stearate, and vinyl octodecanoate there are obtained the corresponding binary copolymers.

EXAMPLE 6

This example illustrates the use of the surfactants of the invention in making rigid polyurethane foams.

One hundred grams (0.77 equiv.) of a methylglucoside propylene oxide adduct (equiv. wt. 129; p. 435 DM) was blended by hand-stirring with 2 g. of the ternary copolymer prepared as described in Example 1, part B, 2 g. of N,N',N'-tetramethyl-1,3-butanediamine and 1 g. of triethylamine at a temperature within the range of 25 to 50° C. The resulting mixture was stirred and trichlorofluoromethane was passed in until the weight of the mixture had increased by 38 g. To the mixture so obtained was added with vigorous stirring 108 g. of PAPI® (polymethylene polyphenyl isocyanate; equivalent weight 133.3; viscosity 181 cps. @ 25° C.) and the product was cast in an open mold 7" x 7" x 12" and allowed to foam freely. There was thus obtained a rigid foam having a uniformly small closed cell structure; density 1.86 lbs./cu. ft. The high structural stability of the foam was demonstrated by the volume change of only +12.4% after maintaining for 14 days at 158° F. and 100% relative humidity.

A rigid foam having similar structural stability and uniformly closed cell structure was obtained using the above procedure but replacing the ternary copolymer prepared as described in Example 1, part B by the ternary copolymer prepared as described in Example 2, part B.

Similarly, foams having the same properties are obtained by replacing the above ternary copolymers by any of the ternary and binary copolymers described in Examples 3 to 5, above.

I claim:
1. In a process for the preparation of a polyurethane foam by reaction of an organic polyisocyanate and a polyol under foaming conditions the improvement which comprises employing as surfactant in the foam mix a copolymer selected from the class consisting of
(a) binary copolymers of a vinyl ester of an alkanoic acid containing from 1 to 18 carbon atoms, inclusive, and a maleamate ester having the formula:

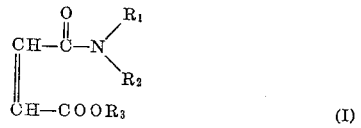
(I)

wherein $R_1$ and $R_2$ taken individually are selected from the class consisting of hydrogen and lower-alkyl and $R_1$ and $R_2$ taken together with the attached N atom represent a 5 to 7 ring atom heterocyclic radial and $R_3$ represents alkyl from 2 to 8 carbon atoms, inclusive, provided that $R_1$ and $R_2$ do not each represent hydrogen simultaneously and that the total number of carbon atoms in $R_1$ and $R_2$ is within the range of 2 to 8, the molar proportions of said vinyl ester of an alkanoic acid and said maleamate ester being within the range of about 4:30 to about 3:1; and
(b) ternary copolymers of a vinyl ester of an alkanoic acid containing from 1 to 18 carbon atoms, inclusive, a maleamate ester having the Formula I above wherein $R_1$, $R_2$ and $R_3$ are as defined above, and a di(lower-alkyl)maleate, the molar proportions of said vinyl ester of an alkanoic acid, said maleamate ester and said di(lower-alkyl)maleate being within the range of about 1:4:2 to about 4:2:1;
wherein each of the copolymers (a) and (b) is obtained by polymerization of the said monomers in the presence of a free radical initiator at a temperature of about 40° C. to about 135° C.

2. In a process for the preparation of a polyurethane foam by reaction of an organic polyisocyanate and a polyol under foaming conditions the improvement which comprises employing as surfactant in the foam mix a ternary copolymer of a vinyl ester of an alkanoic acid, di(lower-alkyl)maleate, and a maleamate ester having the formula:

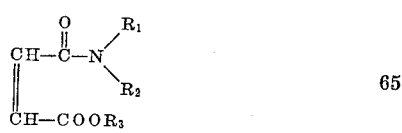

wherein $R_1$ and $R_2$ taken individually are selected from the class consisting of hydrogen and lower-alkyl and $R_1$ and $R_2$ taken together with the attached N atom represent a 5 to 7 ring atom heterocyclic radical and $R_3$ represents alkyl from 2 to 8 carbon atoms, inclusive, provided that $R_1$ and $R_2$ do not each represent hydrogen simultaneously and that the total number of carbon atoms in $R_1$ and $R_2$ is within the range of 2 to 8, the molar proportions of said vinyl ester of an alkanoic acid, di(lower-alkyl)maleate, and maleamate ester being within the range of about 1:2:4 to about 4:1:2, wherein said ternary copolymer is obtained by polymerization of the said monomers in the presence of a free radical initiator at a temperature of about 40° C. to about 135° C.

3. In a process for the preparation of a polyurethane foam by reaction of an organic polyisocyanate and a polyol under foaming conditions the improvement which comprises employing as surfactant in the foam mix a binary copolymer of a vinyl ester of an alkanoic acid and a maleamate ester having the formula:

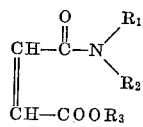

wherein $R_1$ and $R_2$ taken individually are selected from the class consisting of hydrogen and lower-alkyl and $R_1$ and $R_2$ taken together with the attached N atom represent a 5 to 7 ring atom heterocylic radical and $R_3$ represents alkyl from 2 to 8 carbon atoms, inclusive, provided that $R_1$ and $R_2$ do not each represent hydrogen simultaneously and that the total number of carbon atoms in $R_1$ and $R_2$ is within the range of 2 to 8, the molar proportions of said vinyl ester of an alkanoic acid and said maleamate ester being within the range of about 4:3 to about 3:1, wherein said binary copolymer is obtained by polymerization of the said monomers in the presence of a free radical initiator at a temperature of about 40° C. to about 135° C.

4. A process for the preparation of a polyurethane by reaction of an organic polyisocyanate and a polyol under foaming conditions characterized in that there is employed as surfactant in the foam mix a ternary copolymer of vinyl acetate, dibutyl maleate, and butyl N,N-(3-oxapentamethylene)maleamate, the molar proportions of said monomers in the copolymer being within the range of about 1:2:4 to about 4:1:2, wherein said ternary copolymer is obtained by polymerization of the said monomers in the presence of a free radical initiator at a temperature of about 40° C. to about 135° C.

5. A process for the preparation of a polyurethane by reaction of an organic polyisocyanate and a polyol under foaming conditions characterized in that there is employed as surfactant in the foam mix a ternary copolymer of vinyl acetate, dibutyl maleate and butyl N,N-dimethylmaleamate, the molar proportions of said monomers in the copolymer being within the range of about 1:2:4 to about 4:1:2, wherein said ternary copolymer is obtained by polymerization of the said monomers in the presence of a free radical initiator at a temperature of about 40° C. to about 135° C.

References Cited

UNITED STATES PATENTS

| 2,496,275 | 2/1950 | Dickey | 260—78 |
| 2,876,894 | 3/1959 | Dahlquist et al. | 260—78.5 |
| 3,270,032 | 8/1966 | Erner | 260—2.3 |

FOREIGN PATENTS

| 657,704 | 2/1963 | Canada. |
| 885,750 | 12/1961 | Great Britain. |

JAMES A. SEIDLECK, *Primary Examiner.*

DONALD E. CZAJA, *Examiner.*

G. W. RAUCHFUSS, *Assistant Examiner.*